(12) United States Patent
Wu et al.

(10) Patent No.: US 12,346,002 B2
(45) Date of Patent: Jul. 1, 2025

(54) OPTICAL ELEMENT DRIVING MECHANISM

(71) Applicant: TDK TAIWAN CORP., Taoyuan (TW)

(72) Inventors: Ya-Hsiu Wu, Taoyuan (TW); Ying-Jen Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 885 days.

(21) Appl. No.: 17/536,793

(22) Filed: Nov. 29, 2021

(65) Prior Publication Data
US 2022/0179192 A1    Jun. 9, 2022

Related U.S. Application Data

(60) Provisional application No. 63/121,415, filed on Dec. 4, 2020.

(51) Int. Cl.
| | |
|---|---|
| *G03B 11/04* | (2021.01) |
| *G01D 5/14* | (2006.01) |
| *G02B 7/02* | (2021.01) |
| *G02B 7/09* | (2021.01) |
| *G02B 26/08* | (2006.01) |
| *G03B 9/10* | (2021.01) |
| *G03B 9/40* | (2021.01) |
| *G03B 30/00* | (2021.01) |
| *H01F 7/08* | (2006.01) |

(Continued)

(52) U.S. Cl.
CPC ............ *G03B 11/043* (2013.01); *G01D 5/14* (2013.01); *G02B 7/02* (2013.01); *G02B 7/09* (2013.01); *G02B 26/08* (2013.01); *G03B 9/10* (2013.01); *G03B 9/40* (2013.01); *G03B 30/00* (2021.01); *H01F 7/081* (2013.01); *H01F 7/16* (2013.01); *H04N 23/54* (2023.01); *H04N 23/55* (2023.01)

(58) Field of Classification Search
CPC ............ G03B 30/00; G03B 11/043; G03B 2205/0076; G03B 5/02; G03B 9/10; G03B 9/14; G02B 7/02
See application file for complete search history.

(56) References Cited

U.S. PATENT DOCUMENTS

2019/0227300 A1* 7/2019 Tsai .................. G02B 7/182

FOREIGN PATENT DOCUMENTS

| CN | 110687735 A | * | 1/2020 | ........... G02B 27/646 |
| CN | 211826653 U | * | 10/2020 | ............. F03G 7/065 |

(Continued)

*Primary Examiner* — Christopher E Mahoney
(74) *Attorney, Agent, or Firm* — MUNCY, GEISSLER, OLDS & LOWE, P.C.

(57) ABSTRACT

An optical element driving mechanism is provided, including a fixed part, a movable part, and a driving assembly. The fixed part includes a base, a first wall, and a first fixed wire gripper. The first wall is extending from the base. The first fixed wire gripper is disposed on the first wall. The movable part includes a holder, and a movable wire gripper. The holder holds an optical element. The movable wire gripper is disposed on the holder. The driving assembly drives the movable part to move relative to the fixed part, including a first wire. The first wire is connected to the first fixed wire gripper and the movable wire gripper. When the first wire receives a current, the holder is driven to move relative to the fixed part along a first direction.

20 Claims, 5 Drawing Sheets

(51) Int. Cl.
    *H01F 7/16*         (2006.01)
    *H04N 23/54*      (2023.01)
    *H04N 23/55*      (2023.01)

(56) References Cited

FOREIGN PATENT DOCUMENTS

JP           3247575 U   *  7/2024
KR      20180123776 A   *  11/2018  ............. G03B 13/36

* cited by examiner

OPTICAL ELEMENT DRIVING MECHANISM

CROSS REFERENCE TO RELATED APPLICATIONS

This application claims the benefit of U S. Provisional Application No. 63/121,415, filed 4 Dec. 2020 the entirety of which is incorporated by reference herein.

BACKGROUND OF THE INVENTION

Field of the Invention

The present disclosure relates to an optical element driving mechanism, and more particularly to an optical element driving mechanism of an electrical device.

Description of the Related Art

As the relevant technologies have developed, many electronic devices (such as computers and tablets) are equipped with the capability to record images and videos. However, when an optical element (such as lens) having a long focal length is provided in an electronic device, the thickness of the electronic device may be increased, impeding the prospects for miniaturization of the electronic device. Therefore, how to design an optical element driving mechanism and an optical device that may miniaturize the electronic device has become an important issue.

BRIEF SUMMARY OF THE INVENTION

To solve the problems of the prior art, an optical element driving mechanism is provided, including a fixed part, a movable part, and a driving assembly. The fixed part includes a base, a first wall, and a first fixed wire gripper. The first wall is extending from the base. The first fixed wire gripper is disposed on the first wall. The movable part includes a holder, and a movable wire gripper. The holder holds an optical element. The movable wire gripper is disposed on the holder. The driving assembly drives the movable part to move relative to the fixed part, including a first wire. The first wire is connected to the first fixed wire gripper and the movable wire gripper. When the first wire receives a current, the holder is driven to move relative to the fixed part along a first direction.

In one of the embodiments of the present disclosure, the fixed part further includes: a second wall, extending from the base; a top cover, disposed on the first wall and the second wall, including an optical element opening; and a second fixed wire gripper, disposed on the second wall. The drive assembly further includes a second wire, connected to the second fixed wire gripper and the movable wire gripper. When the first wire receives the current, the holder is driven so that the optical element and the optical element opening at least partially overlap when viewed along a second direction that is perpendicular to the first direction. When the second wire receives the current, the holder is driven so that the optical element and the optical element opening at least not partially overlap when viewed along the second direction. The first wire includes a shape memory alloy. The second wire includes a shape memory alloy.

In one of the embodiments of the present disclosure, the fixed part further includes a winding shaft partition plate, disposed between the first wire and the second wire.

In one of the embodiments of the present disclosure, the holder further includes an optical element protrusion, penetrating the opening of the optical element.

In one of the embodiments of the present disclosure, the fixed part further includes a plurality of first winding shafts and a plurality of second winding shafts. The first wire at least partially surrounds the first winding shafts and the second winding shafts.

In one of the embodiments of the present disclosure, the first winding shafts and the second winding shafts are made of metal.

In one of the embodiments of the present disclosure, the fixed part further includes a first side wall and a second side wall, the first side wall includes a plurality of first winding shaft openings, and the second side wall includes a plurality of second winding shaft openings. The first winding shafts and the second winding shafts are located between the first side wall and the second side wall, and the two ends of each of the first winding shafts and the second winding shafts are located in the first winding shaft openings and the second winding shaft openings, respectively.

In one of the embodiments of the present disclosure, the fixed part further includes a winding shaft partition plate, disposed between the first side wall and the second side wall.

In one of the embodiments of the present disclosure, the winding shaft partition plate includes a plurality of third winding shaft openings, wherein the first winding shafts and the second winding shafts penetrate the third winding shaft openings.

In one of the embodiments of the present disclosure, the fixed part further includes a plurality of partition walls, extending from the base, wherein the winding shaft partition plate is arranged between the partition walls.

In one of the embodiments of the present disclosure, the partition walls are disposed between the second winding shafts.

In one of the embodiments of the present disclosure, the height of each of the partition walls is smaller than the height of the second winding shafts when viewed along a third direction that is perpendicular to the first direction.

In one of the embodiments of the present disclosure, the partition walls are disposed between the first side wall and the second side wall, and each of the partition walls are at least in contact with the first side wall or the second side wall.

In one of the embodiments of the present disclosure, the optical element driving mechanism further includes a spring, wherein the movable part further includes a protruding column, and the spring is always in contact with the protruding column.

In one of the embodiments of the present disclosure, the spring includes a first contacting portion and a second contacting portion, wherein the shortest distance between the first contacting portion and the second contacting portion is smaller than the size of the protruding column.

In one of the embodiments of the present disclosure, the first contacting portion and the second contacting portion have trapezoidal shapes.

In one of the embodiments of the present disclosure, the protruding column is made of metal, and the protruding column is always electrically connected to the spring.

In one of the embodiments of the present disclosure, the protruding column is electrically connected to the movable wire gripper.

In one of the embodiments of the present disclosure, the first wall further includes a first wall protrusion, and the spring further includes a spring opening, wherein the first wall protrusion penetrates the spring opening, wherein the height of the protruding column is greater than the height of the first wall protrusion when viewed along the first direction.

In one of the embodiments of the present disclosure, the fixing part further includes a top cover, disposed on the first wall, wherein the top cover includes a protruding column opening, wherein the protruding column penetrates the protruding column opening.

BRIEF DESCRIPTION OF THE DRAWINGS

In order to make the above and other objectives, features, and advantages of the present disclosure more obvious and understandable, preferred embodiments are listed below in conjunction with the accompanying drawings, which are described in detail as follows.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
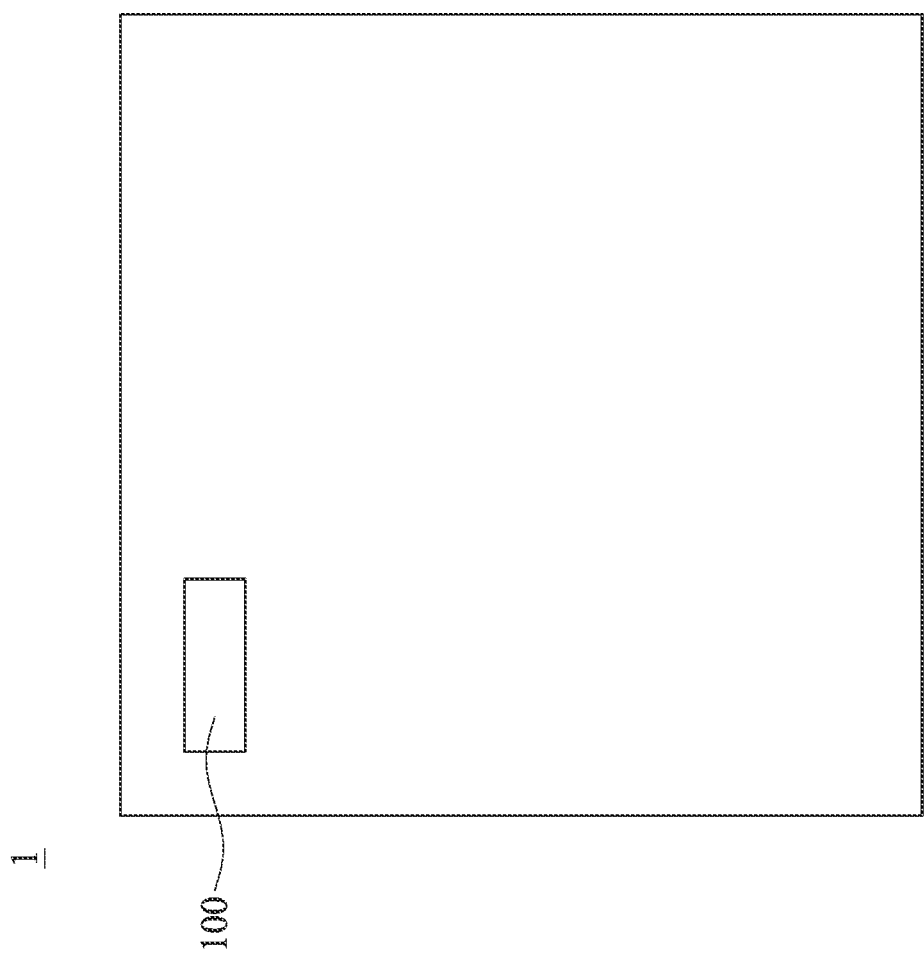
FIG. 1 is a schematic view of an electrical device according to some embodiment of the present disclosure.

Firstly, please refer to FIG. 1, FIG. 1 is a schematic view of an electrical device 1 according to some embodiment of the present disclosure. As shown in FIG. 1, an optical element driving mechanism 100 of some embodiment of the present disclosure may be mounted in an electrical device 1 for taking photos or videos, wherein the aforementioned electrical device 1 may, for example, be a smartphone or a digital camera, but the present disclosure is not limited to these. It should be noted that the position and the size between the optical element driving mechanism 9-100 and the electrical device 9-1 shown in FIG. 1 are only an example, which is not for limiting the position and the size between the optical element driving mechanism 100 and the electrical device 1. In fact, according to different needs, the optical element driving mechanism 100 may be mounted at different positions in the electrical device 1.

Figure 2:
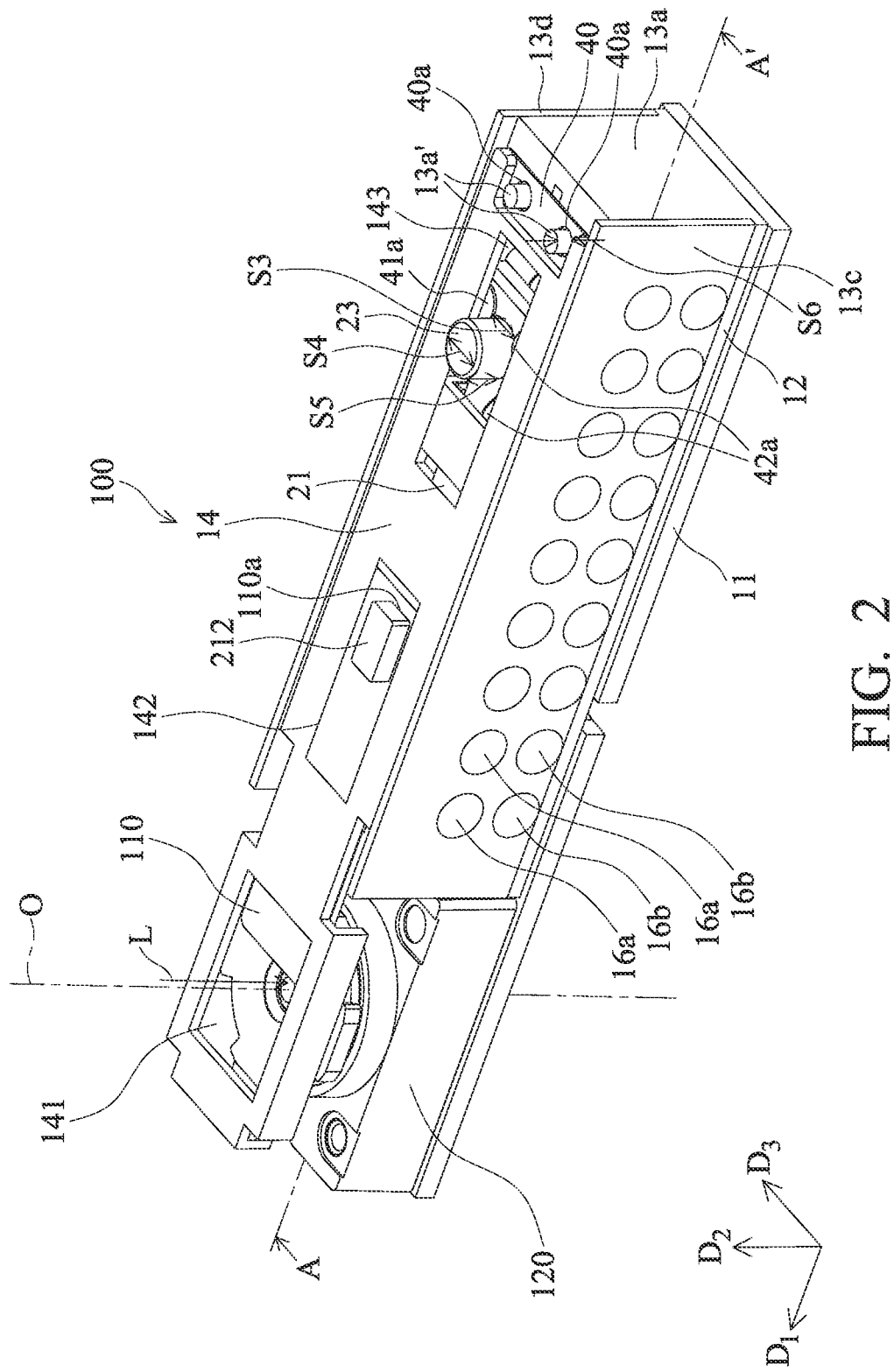
FIG. 2 shows a perspective view of an optical element driving mechanism, an optical element, and a photosensitive module according to some embodiments of the disclosure.

Please refer to FIG. 2. FIG. 2 is a perspective view of the optical element driving mechanism 100, the optical element 110, and the photosensitive module 120 according to some embodiments of the disclosure. The optical element driving mechanism 100 holds an optical element 110. A photosensitive module 120 may be provided inside or outside the optical element driving mechanism 100. The photosensitive module 120 is located downstream of the light incident to the optical element driving mechanism 100. An incident light L is incident along an optical axis O through the optical element 110 in the optical element driving mechanism 100, and then reaches the photosensitive module 120 (for example, a camera) for imaging.

Figure 3:
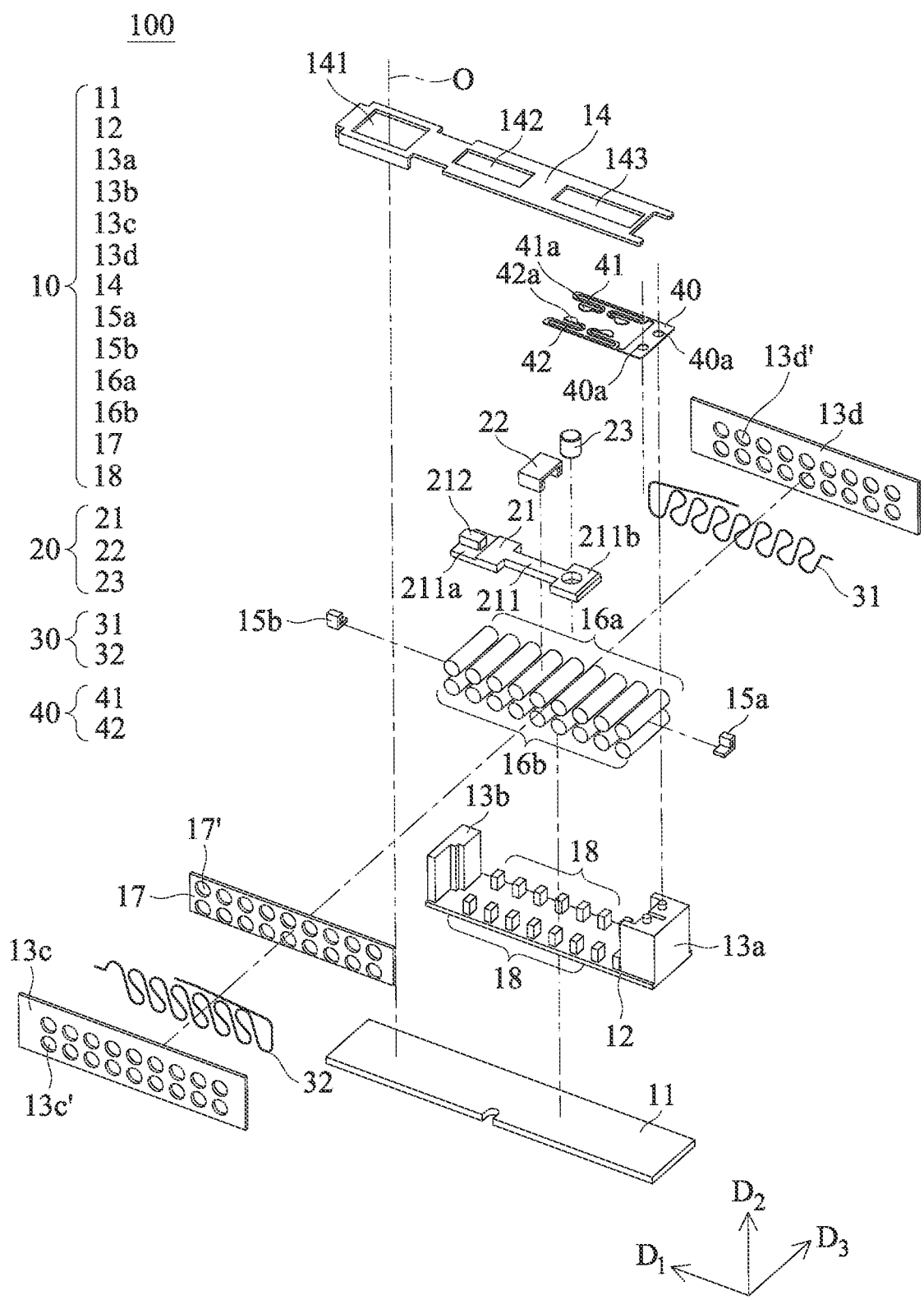
FIG. 3 shows an exploded view of the optical element driving mechanism according to some embodiments of the present disclosure.

FIG. 3 is an exploded view of the optical element driving mechanism 100 according to some embodiments of the disclosure. Please refer to FIG. 2 and FIG. 3 at the same time, the optical element driving mechanism 100 may include a fixed part 10, a movable part 20, a driving assembly 30, and a spring 40. The driving assembly 30 may drive the movable part 20 to move relative to the fixed part 10.

The fixed part 10 may include a bottom plate 11, a base 12, a first wall 13a, a second wall 13b, a first side wall 13c, a second side wall 13d, a top cover 14, and a first fixed wire gripper 15a, a second fixed wire gripper 15b, a plurality of first winding shafts 16a, a plurality of second winding shafts 16b, a winding shaft partition plate 17, and a plurality of partition walls 18.

In some embodiments, the bottom plate 11 may have a plate shape, and the bottom plate 11 is perpendicular to the optical axis O. In some embodiments, the bottom plate 11 may extend along a first direction D1. The base 12 may be disposed on the bottom plate 11. In some embodiments, the base 12 may be fixedly disposed on the bottom plate 11.

The first wall 13a extends along a second direction D2 from the base 12, and the second wall 13b also extends along the second direction D2 from the base 12. It should be noted that the second direction D2 may be parallel to the optical axis O. and the second direction D2 may be perpendicular to the first direction D1. The first wall 13a and the second wall 13b are opposite to each other in the first direction D1. The first wall 13a may include a first wall protrusion 13a'.

The first side wall 13c extends along the second direction D2 from the base 12, and the second side wall 13d also extends along the second direction D2 from the base 12. The first side wall 13c and the second side wall 13d are opposite to each other in a third direction D3. It should be noted that the third direction D3 may be perpendicular to the first direction D1 and the second direction D2. The first side wall 13c includes a plurality of first winding shaft openings 13c', and the second side wall 13d includes a plurality of second winding shaft openings 13d'.

The top cover 14 is disposed on the first wall 13a, the second wall 13b, the first side wall 13c, and the second side wall 13d. The top cover 14 may include an optical element opening 141, an optical element protrusion opening 142, and a protruding column opening 143. The first fixed wire gripper 15a is disposed on the first wall 13a, and the second fixed wire gripper 15b is disposed on the second wall 13b. The optical element opening 141 may overlap the optical element 110.

In some embodiments, the first winding shaft 16a and the second winding shaft 16b may be made of metal. The first winding shaft 16a and the second winding shaft 16b are located between the first side wall 13c and the second side wall 13d. Both ends of the first winding shaft 16a and the second winding shaft 16b are inserted into the first winding shaft opening 13c' and the second winding shaft opening 13d'.

In other words, each first winding shaft 16a is located in the first winding shaft opening 13c' and the second winding shaft opening 13d', and each second winding shaft 16b is located in the first winding shaft opening 13c' and the second winding shaft opening 13d'. In this way, unwanted movement and deformation of the first winding shaft 16a and the second winding shaft 16b may be avoided.

Figure 4:
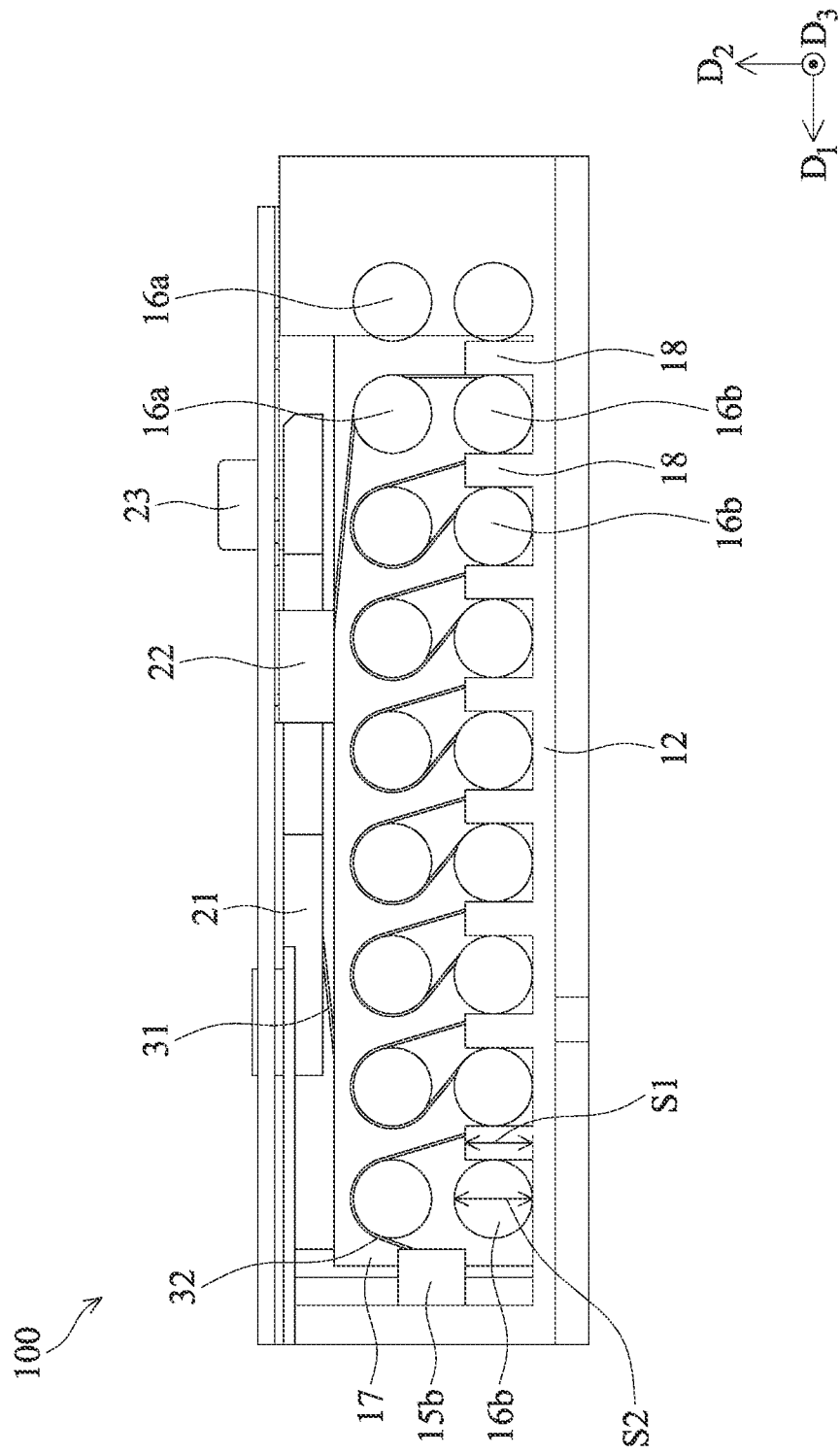
FIG. 4 shows a cross-sectional view of the optical element driving mechanism along line A-A' of FIG. 2, according to some embodiments of the present disclosure.

Please refer to FIG. 4, FIG. 4 is a cross-sectional view of the optical element driving mechanism 100 along line A-A' of FIG. 2, according to some embodiments of the present disclosure. In some embodiments, the first winding shaft 16a may be located above the second winding shaft 16b. Moreover, each first winding shaft 16a may corresponds to a corresponding second winding shaft 16b. In some embodiments, each first winding shaft 16a and its corresponding second winding shaft 16b are arranged along the second direction D2. In some embodiments, the second winding shaft 16b may be in direct contact with the base 12.

The winding shaft partition plate 17 is provided between the first side wall 13c and the second side wall 13d. The winding shaft partition plate 17 includes a plurality of third winding shaft openings 17'. The first winding shaft 16a and the second winding shaft 16b may pass through the third winding shaft opening 17'. In this way, unwanted movement of the first winding shaft 16a and the second winding shaft 16b may be avoided.

The partition wall 18 may extend along the second direction D2 from the base 12. A part of the partition wall 18 may be arranged abutting against the first side wall 13c, and another part of the partition wall 18 may be arranged abutting against the second side wall 13d. Therefore, each partition wall 18 is at least in (direct) contact with the first side wall 13c or the second side wall 13d. The partition wall 18 is provided between the first side wall 13c and the second side wall 13d.

In some embodiments, the partition wall 18 may be disposed between the first winding shafts 16a to separate each first winding shaft 16a from each other, and the partition wall 18 may prevent unwanted movement of the first winding shaft 16a and avoid deformation (not shown) of the first winding shaft 16a.

As shown in FIG. 4, in some embodiments, the partition wall 18 may be disposed between the second winding shafts 16b to separate each second winding shaft 16b from each other, and the partition wall 18 may prevent unwanted movement of the second winding shaft 16b and avoid deformation of the second winding shaft 16b.

It should be noted that, in some embodiments, the height S1 of each partition wall 18 is smaller than the height S2 of each second winding shaft 16b when viewed along the third direction D3. In this way, unwanted movement of the second winding shaft 16b may be effectively avoided while minimizing the optical element driving mechanism 100.

It should be noted that, in some embodiments, the winding shaft partition plate 17 is disposed between the partition wall 18 that abuts against the first side wall 13c and the partition wall 18 that abuts against the second side wall 13d. Therefore, the third winding shaft openings 17' of the winding shaft partition plate 17 may effectively support the middle portion of the first winding shaft 16a and the second winding shaft 16b, so as to prevent the deformation of the first winding shaft 16a and the second winding shaft 16b.

Please refer to FIG. 2 and FIG. 3 at the same time, the movable part 20 may include a holder 21, a movable wire gripper 22, and a protruding column 23.

The holder 21 may carry the optical element 110. The optical element 110 herein may be a SOMA (for example, the optical element 110 may be a shield, a shutter, an aperture), a prism, a lens, a camera module, a photosensitive element, and other elements that are related to optics. The holder 21 may include a holder body 211, and an optical element protrusion 212.

In some embodiments, the holder body 211 is substantially I-shaped. That is, the width of the middle portion of the holder body 211 is smaller than the width of two ends of the holder body 211 when viewed along the second direction D2, so that the holder body 211 has an elongated middle portion. The optical element protrusion 212 is formed on the holder body 211. In some embodiments, the optical element protrusion 212 may be formed on a first end 211a of the holder body 211.

Moreover, in some embodiments, the optical element protrusion 212 may penetrate an opening 110a of the optical element 110. Alternatively, in other embodiments, the optical element protrusion 212 may be connected to the optical element 110 in other ways. In this way, when the holder 21 is moved, the optical element 110 will also be moved along with the holder 21.

The optical element protrusion 212 may also penetrate the optical element protrusion opening 142 of the top cover 14. The sides of the optical element protrusion opening 142 may limit the movement range of the optical element protrusion 212.

For example, in some embodiments, the sides of the optical element protrusion opening 142 may limit the movement range of the optical element protrusion 212 along the first direction D1, so as to avoid unwanted movement of the holder 21. For example, in some embodiments, the sides of the optical element protrusion opening 142 may limit the movement range of the optical element protrusion 212 along the third direction D3, so as to avoid unwanted movement of the holder 21.

The movable wire gripper 22 is disposed on the holder 21. In some embodiments, the movable wire gripper 22 is fixedly disposed on the elongated middle part of the holder body 211. Therefore, when the movable wire gripper 22 is moved, the holder 21 will also be moved along with the movable wire gripper 22.

The protruding column 23 is disposed on the holder 21. In some embodiments, the protruding column 23 may be disposed on a second end 211b of the holder body 211. In some embodiments, the protruding column 23 may be made of metal. In some embodiments, the protruding column 23 may be electrically connected to the movable wire gripper 22 via a metal wire (not shown) that is insert-molded injection. The protruding column 23 may penetrate the protruding column opening 143 of the top cover 14. The side of the protruding column opening 143 may limit the movement range of the protruding column 23.

For example, in some embodiments, the side of the protruding column opening 143 may limit the movement range of the protruding column 23 along the first direction D1, so as to avoid unwanted movement of the holder 21. For example, in some embodiments, the side of the protruding column opening 143 may limit the movement range of the protruding column 23 along the third direction D3, so as to avoid unwanted movement of the holder 21.

In some embodiments, the height 23' of the protruding column 23 may be greater than the height of the optical element protrusion 212 when viewed along the third direction D3. In some embodiments, the movable wire gripper 22 may be located between the optical element protrusion 212 and the protruding column 23 when viewed along the third direction D3. In this way, the structure of the holder 21 may be more stable, and it may be helpful for miniaturization.

The driving assembly 30 may include a first wire 31 and a second wire 32. In some embodiments, the first wire 31 includes shape memory alloys (SMA). In some embodiments, the second wire 32 includes shape memory alloys.

The first wire 31 is connected to the first fixed wire gripper 15a and the movable wire gripper 22, so that when the first wire 31 receives a current, the first wire 31 may contract (or stretch) to drive the movable wire gripper 22. Therefore, the holder 21 may move relative to the fixed part 10 along the first direction D1.

The second wire 32 is connected to the second fixed wire gripper 15b and the movable wire gripper 22 (may refer to FIG. 4), so that when the second wire 32 receives the current, the second wire 32 may be contract (or stretch) to drive the movable wire gripper 22. Therefore, the holder 21 may move relative to the fixed part 10 along the first direction D1. It should be noted that the direction driven by the second wire 32 may be opposite to the direction driven by the first wire 31.

In some embodiments, w % ben the first wire 31 receives the current and drives the holder 21, the optical element 110 and the optical element opening 141 are at least partially overlapped (or completely overlap) when viewed along the second direction D2. In this way, the incident light L that reaches the photosensitive module for imaging may be decreased.

In some embodiments, when the second wire 32 receives the current and drives the holder 21, the optical element 110 and the optical element opening 141 are at least not partially overlapped (or, do not overlap at all) when viewed along the second direction D2. In this way, the incident light L that reaches the photosensitive module for imaging may be increased.

The first wire 31 and the second wire 32 are separated by the winding shaft partition plate 17. In other words, the winding shaft partition plate 17 may be disposed between the first wire 31 and the second wire 32. Therefore, unwanted movement of the first wire 31 and second wire 32 may be avoided, and the problem that the first wire 31 and second wire 32 entangles with each other may be avoided either.

The first wire 31 at least partially surrounds the first winding shaft 16a and the second winding shaft 16b. Moreover, the second wire 32 also at least partially surrounds the first winding shaft 16a and the second winding shaft 16b (may refer to FIG. 4). In this way, the lengths of the first wire 31 and the second wire 32 may be increased, and the path of contracting and stretching of the first wire 31 and the second wire 32 may be restricted, such that the contraction and stretching of the first wire 31 and the second wire 32 are increased, and unwanted movement of the first wire 31 and the second wire 32 may be avoided.

The spring 40 may include a first contacting portion 41, a second contacting portion 42, and a spring opening 40a. The spring 40 may be flexible. In some embodiments, the spring 40 is always in contact with the protruding column 23. In some embodiments, the spring 40 is always electrically connected to the protruding column 23 (may refer to FIG. 2). Please continue to refer to FIG. 2 and FIG. 3, the first contacting portion 41 and the second contacting portion 42 of the spring 40 may have shapes that are similar to each other.

Figure 5:
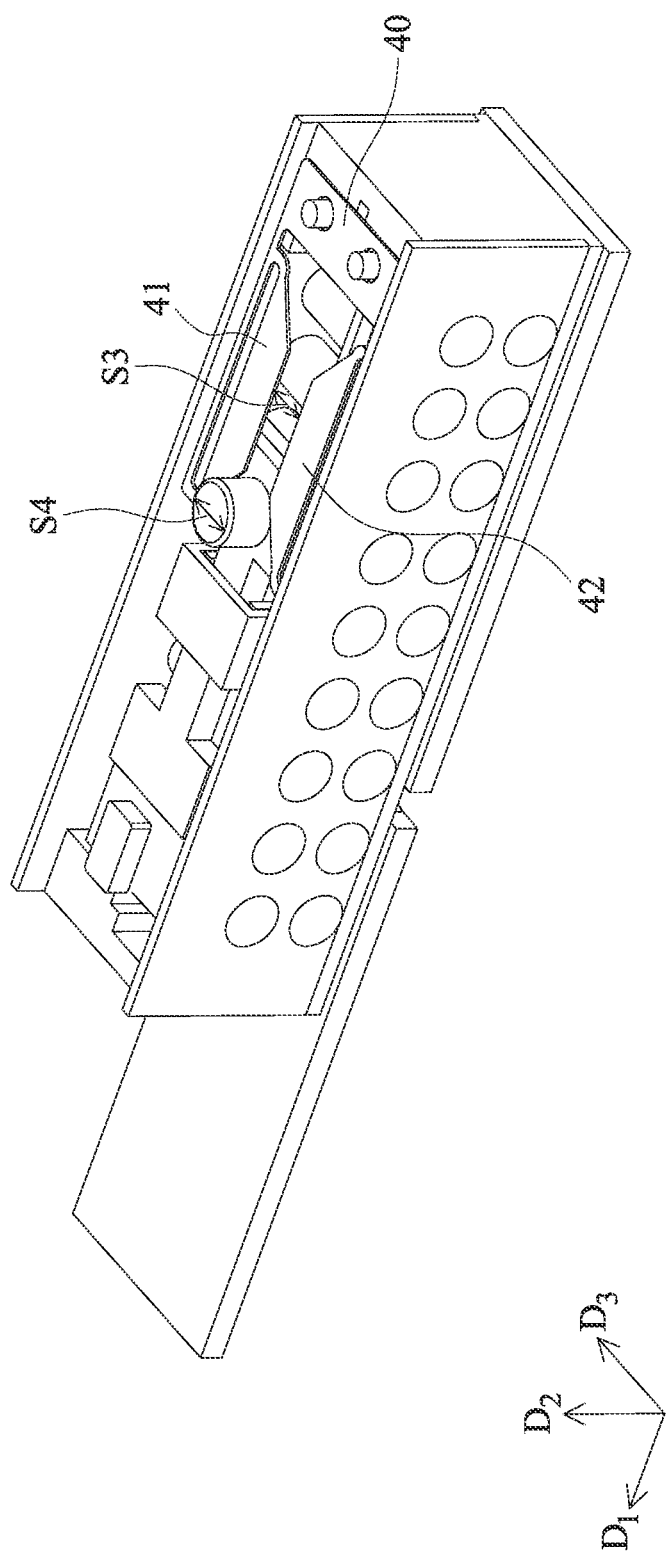
FIG. 5 shows a schematic view of an optical element driving mechanism according to other embodiments of the disclosure.

Please refer to FIG. 5. FIG. 5 is a schematic diagram of an optical element driving mechanism 100 according to other embodiments of the present disclosure. As shown in FIG. 5, in some embodiments, the first contacting portion 41 and the second contacting portion 42 of the spring 40 may have a trapezoidal shape, such that the spring 40 is always in contact with the protruding column 23, and such that the spring 40 is always electrically connected to the protruding column 23.

In some embodiments, the first contacting portion 41 of the spring 40 may have a first protrusion 41a, and the second contacting portion 42 may have a second protrusion 42a. In this way, the spring 40 may always be in contact with the protruding column 23, and the spring 40 may always be electrically connected to the protruding column 23.

It should be noted that, no matter what shapes the first contacting portion 41 and the second contacting portion 42 of the spring 40 exhibit, the shortest distance S3 between the first contacting portion 41 and the second contacting portion 42 of the spring 40 is smaller than the size S4 of the protruding column 23 (may refer to FIG. 2). In this way, the spring 40 may be in contact with and electrically connected to the protruding column 23 more effectively. For example, in some embodiments, the shortest distance S3 between the first contacting portion 41 and the second contacting portion 42 of the spring 40 may be the shortest distance between the first protrusion 41a and the second protrusion 42a.

Please continue to refer to FIG. 2, first wall protrusion 13a' of the first wall 13a may penetrate the spring opening 40a of the spring 40, so that the spring 40 is fixed to the first wall 13a. Moreover, along the first direction D1 as viewed, the height S5 of the protruding column 23 is greater than the height S6 of the first wall protrusion. In this way, the spring 40 may be in contact with and electrically connected to the protruding column 23 more effectively.

In general, the optical element driving mechanism disclosed in the embodiments of the present disclosure may drive the optical element more quickly by applying current to the first wire and the second wire, and may make the optical element to move accurately to a desired position. Moreover, the optical element driving mechanism disclosed in the embodiment of the present disclosure has the effects of miniaturization and weight lightening. Furthermore, the optical element driving mechanism disclosed in the embodiment of the present disclosure also has the advantages of stability and durability.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
   a fixed part, comprising:
      a base;
      a first wall, extending from the base; and
      a first fixed wire gripper, disposed on the first wall;
   a movable part, comprising:
      a holder, wherein the holder holds an optical element; and
      a movable wire gripper, disposed on the holder; and
   a drive assembly, driving the movable part to move relative to the fixed part, comprising:
      a first wire, connected to the first fixed wire gripper and the movable wire gripper,
   wherein when the first wire receives a current, the holder is driven to move relative to the fixed part along a first direction;
   wherein the fixed part further comprises:
      a second wall, extending from the base;
      a top cover, disposed on the first wall and the second wall, comprising an optical element opening; and
      a second fixed wire gripper, disposed on the second wall,
   wherein the drive assembly further comprises:
      a second wire, connected to the second fixed wire gripper and the movable wire gripper,
   wherein when the first wire receives the current, the holder is driven so that the optical element and the optical element opening at least partially overlap when viewed along a second direction that is perpendicular to the first direction,
   wherein when the second wire receives the current, the holder is driven so that the optical element and the optical element opening at least not partially overlap when viewed along the second direction.

2. The optical element driving mechanism as claimed in claim 1,
   wherein the first wire comprises a shape memory alloy,
   wherein the second wire comprises a shape memory alloy.

3. The optical element driving mechanism as claimed in claim 2, wherein the fixed part further comprises a winding shaft partition plate, disposed between the first wire and the second wire.

4. The optical element driving mechanism as claimed in claim 1, wherein the holder further comprises an optical element protrusion, penetrating an opening of the optical element.

5. An optical element driving mechanism, comprising:
   a fixed part, comprising:
      a base;
      a first wall, extending from the base; and
      a first fixed wire gripper, disposed on the first wall;
   a movable part, comprising:
      a holder, wherein the holder holds an optical element; and
      a movable wire gripper, disposed on the holder; and
   a drive assembly, driving the movable part to move relative to the fixed part, comprising:
      a first wire, connected to the first fixed wire gripper and the movable wire gripper,
   wherein when the first wire receives a current, the holder is driven to move relative to the fixed part along a first direction;
   wherein the fixed part further comprises a plurality of first winding shafts and a plurality of second winding shafts,
   wherein the first wire at least partially surrounds the first winding shafts and the second winding shafts.

6. The optical element driving mechanism as claimed in claim 5, wherein the first winding shafts and the second winding shafts are made of metal.

7. The optical element driving mechanism as claimed in claim 5, wherein the fixed part further comprises a first side wall and a second side wall, the first side wall comprises a plurality of first winding shaft openings, and the second side wall comprises a plurality of second winding shaft openings,
   wherein the first winding shafts and the second winding shafts are located between the first side wall and the second side wall, and the two ends of each of the first winding shafts and the second winding shafts are located in the first winding shaft openings and the second winding shaft openings, respectively.

8. The optical element driving mechanism as claimed in claim 7, wherein the fixed part further comprises a winding shaft partition plate, disposed between the first side wall and the second side wall.

9. The optical element driving mechanism as claimed in claim 8, wherein the winding shaft partition plate comprises a plurality of third winding shaft openings, wherein the first winding shafts and the second winding shafts penetrate the third winding shaft openings.

10. The optical element driving mechanism as claimed in claim 7, wherein the fixed part further comprises a plurality of partition walls, extending from the base, wherein the winding shaft partition plate is arranged between the partition walls.

11. The optical element driving mechanism as claimed in claim 10, wherein the partition walls are disposed between the second winding shafts.

12. The optical element driving mechanism as claimed in claim 10, wherein the partition walls are disposed between the first side wall and the second side wall, and each of the partition walls are at least in contact with one of the first side wall or the second side wall.

13. The optical element driving mechanism as claimed in claim 5, wherein the height of each of the partition walls is smaller than the height of the second winding shafts when viewed along a third direction that is perpendicular to the first direction.

14. The optical element driving mechanism as claimed in claim 1, further comprising a spring, wherein the movable part further comprises a protruding column, and the spring is always in contact with the protruding column.

15. The optical element driving mechanism as claimed in claim 14, wherein the spring comprises a first contacting portion and a second contacting portion, wherein the shortest distance between the first contacting portion and the second contacting portion is smaller than the size of the protruding column.

16. The optical element driving mechanism as claimed in claim 15, wherein the first contacting portion and the second contacting portion have trapezoidal shapes.

17. The optical element driving mechanism as claimed in claim 14, wherein the protruding column is made of metal, and the protruding column is always electrically connected to the spring.

18. The optical element driving mechanism as claimed in claim 17, wherein the protruding column is electrically connected to the movable wire gripper.

19. The optical element driving mechanism as claimed in claim 14, wherein the first wall further comprises a first wall protrusion, and the spring further comprises a spring opening, wherein the first wall protrusion penetrates the spring opening, wherein the height of the protruding column is greater than the height of the first wall protrusion when viewed along the first direction.

20. The optical element driving mechanism as claimed in claim 14, wherein the top cover comprises a protruding column opening, wherein the protruding column penetrates the protruding column opening.

\* \* \* \* \*